United States Patent [19]

Killer et al.

[11] Patent Number: 5,335,767
[45] Date of Patent: Aug. 9, 1994

[54] ARRANGEMENT FOR THE SORTING OF PIECE GOODS

[75] Inventors: Viktor Killer, Riedikon; Willy Maier, Kloten, both of Switzerland

[73] Assignee: Muller Martini Versand Systeme AG, Zurich, Switzerland

[21] Appl. No.: 968,271

[22] Filed: Oct. 29, 1992

[30] Foreign Application Priority Data

Oct. 29, 1991 [CH] Switzerland ............ 3167/91-0

[51] Int. Cl.5 .................................. B65G 47/46
[52] U.S. Cl. .......................... 198/365; 209/900
[58] Field of Search ............ 198/365, 477.1, 802; 209/900; 105/263; 296/184; 298/8 R, 8 H, 18

[56] References Cited

U.S. PATENT DOCUMENTS

| | | | |
|---|---|---|---|
| 1,926,439 | 9/1933 | Fildes | 298/8 H |
| 3,167,192 | 1/1965 | Harrison et al. | 214/62 |
| 3,265,190 | 8/1966 | Boehm | 198/365 |
| 3,269,520 | 8/1966 | Bishop et al. | 198/365 |
| 3,300,026 | 1/1967 | Lens et al. | 198/143 |
| 3,662,874 | 5/1972 | Muller | 198/155 |
| 3,669,245 | 6/1972 | Wooten et al. | 198/365 |
| 3,848,728 | 11/1974 | Leibrick et al. | 198/365 |
| 3,913,725 | 10/1975 | Harrison | 198/23 |
| 4,089,404 | 5/1978 | Venzke | 198/365 |
| 4,413,721 | 11/1983 | Bollier | 198/365 |
| 4,586,613 | 5/1986 | Horii | 198/365 |
| 4,729,466 | 3/1988 | Bollier et al. | 198/365 |
| 4,938,335 | 7/1990 | Canziani | 198/365 |

FOREIGN PATENT DOCUMENTS

| | | | |
|---|---|---|---|
| 0339337 | 11/1989 | European Pat. Off. | B07C 3/08 |
| 2151439 | 4/1972 | Fed. Rep. of Germany | B65G 47/46 |
| 3050102 | 7/1981 | Fed. Rep. of Germany | B65G 47/46 |
| 1170273 | 1/1959 | France | 105/263 |
| WO89/03796 | 5/1989 | PCT Int'l Appl. | B65G 47/38 |
| 1544570 | 4/1979 | United Kingdom | B65G 47/40 |
| 1597229 | 9/1981 | United Kingdom | B65G 17/48 |

Primary Examiner—Joseph E. Valenza
Attorney, Agent, or Firm—Roper & Quigg

[57] ABSTRACT

A sorting plant which has a closed rail (3) that forms a loop (2) on which an endless chain (4) of carts is guided. Loading stations (9) for the loading of the carts (5) with piece goods (10), as well as target stations (11) that receive the piece goods (10), are arranged along the rails (3). Each cart (5) has two receptacles (13, 14) that can be individually swiveled about a collective axis and also two separate activation elements to tilt the receptacles (13, 14). Each target station (11) has two cams that can be individually activated to initiate the tilting process. A package (10) is loaded onto the cart (5) at the loading station (9), namely, onto both receptacles (13, 14) of this cart (5) or only one of these receptacles, depending on the size of the package (10). The target station (11) of the occupied receptacle (13, 14), or the occupied receptacles (13, 14), are entered into a control device (12). As soon as the cart reaches this target station (11), the receptacle(s) (13, 14) are tilted by activation of the corresponding cam(s). This form of construction provides a higher transport capacity and an increased flexibility of the plant.

16 Claims, 6 Drawing Sheets

ARRANGEMENT FOR THE SORTING OF PIECE GOODS

TECHNICAL FIELD

This invention is directed to a sorting plant for piece goods and to a cart with two receptacles for use in sorting plants.

BACKGROUND ART

German Patent No. 30 50 102 describes a sorting plant which has an endless chain of carts which circulates on a closed rail that forms a loop. Each cart of this chain has a receptacle that can be swiveled about on a slanted axis from its horizontal starting position into two dumping positions. Several loading stations at which the piece goods are loaded onto the receptacles and several target stations are arranged along the loop. One of the target stations is assigned to the cart onto which the piece goods are loaded at the loading station. Once the cart reaches the target station, a horizontal rail is transversely displaced, so that it presses against the outer perimeter of a rotating disk arranged on the cart. This results in the disk being turned, thus tilting the receptacle into one of its two dumping positions, so that the piece goods are unloaded at the target station.

This plant has proven itself very well in practical application, particularly in those instances where the size of the piece goods fluctuates only slightly. However, if the size of the various piece goods fluctuates significantly, certain difficulties exist with regard to accuracy at the target stations since the receptacles that are tilted about the slanted axes accelerate the piece goods differently, toward the side, depending on the position of their center of gravity. The speed of the chain of carts must thus be reduced if significantly fluctuating sizes of piece goods are transported, which in turn also limits the capacity of the plant.

DE-OS 26 58 517 describes another sorting plant. In this particular instance, the carrying receptacles of the carts can be selectively swiveled about one of two horizontal axes that are laterally displaced relative to each other. In the starting position the receptacle is retracted into correspondingly offset bearing shells by two tension springs. This application also mentions that one individual package could be placed onto two carrying receptacles. However, this is only possible if the rail has a linear extension between the loading station and the target station since the unavoidable relative movement of adjacent receptacles on curves or on inclines would lead to an uncontrollable displacement of the package and thus to disruptions in the activity of the plant because the position of the center of gravity and the condition of the packages would vary significantly. In addition to this, the unloading of a package at the target station largely depends on the position of the center of gravity and thus, according to this suggestion, becomes relatively inaccurate.

DISCLOSURE OF THE INVENTION

The invention is based on the objective to develop a sorting plant in such a way that piece goods consisting of the most varied sizes can be efficiently sorted. This objective is attained by the combination of characteristics herein described.

BRIEF DESCRIPTION OF THE DRAWINGS

One example of the invention is described in detail with the aid of the figures.

MODES FOR CARRYING OUT THE INVENTION

Figure 1:
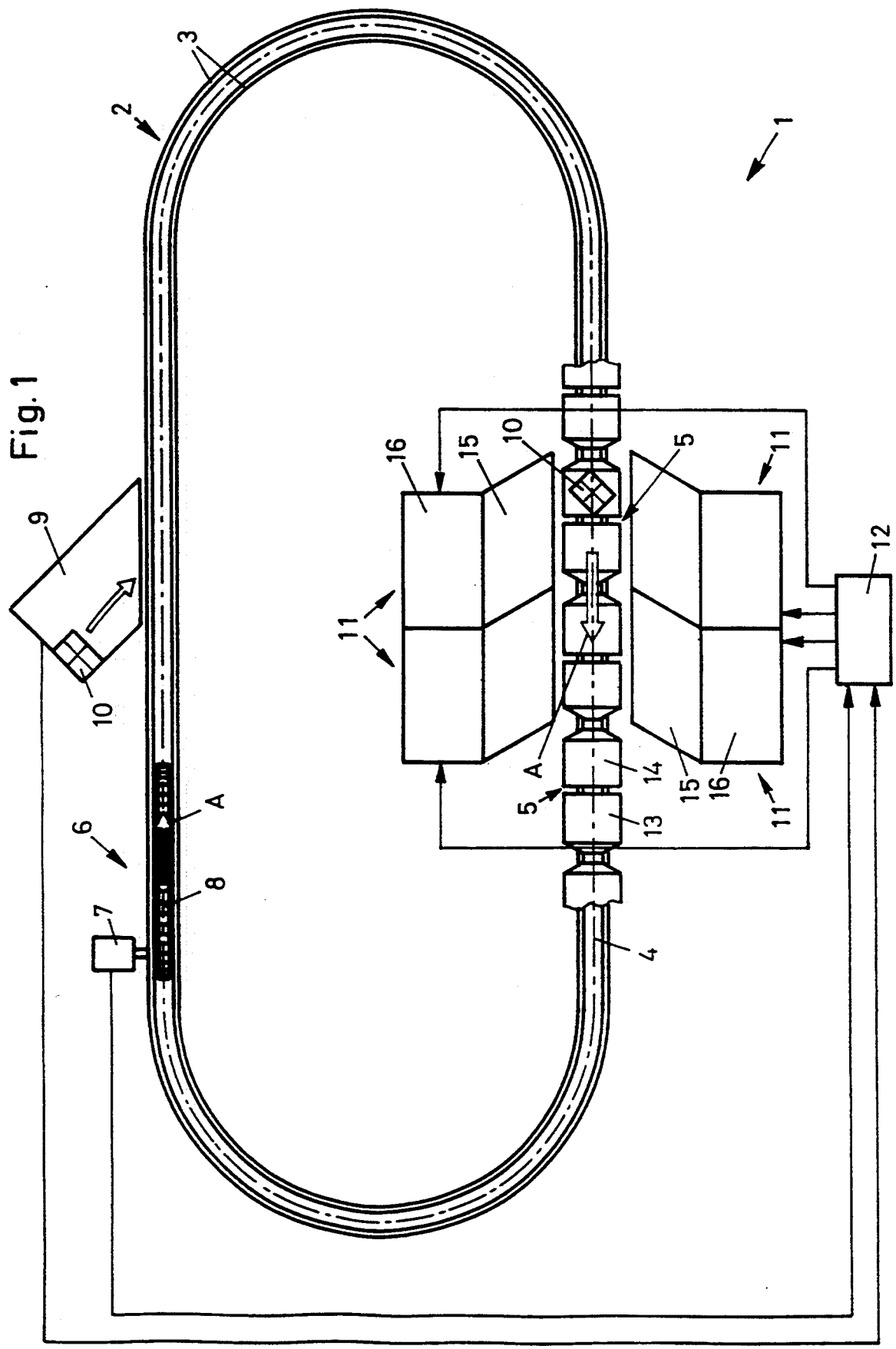
FIG. 1 is a simplified plan of the plant.
Figure 2:
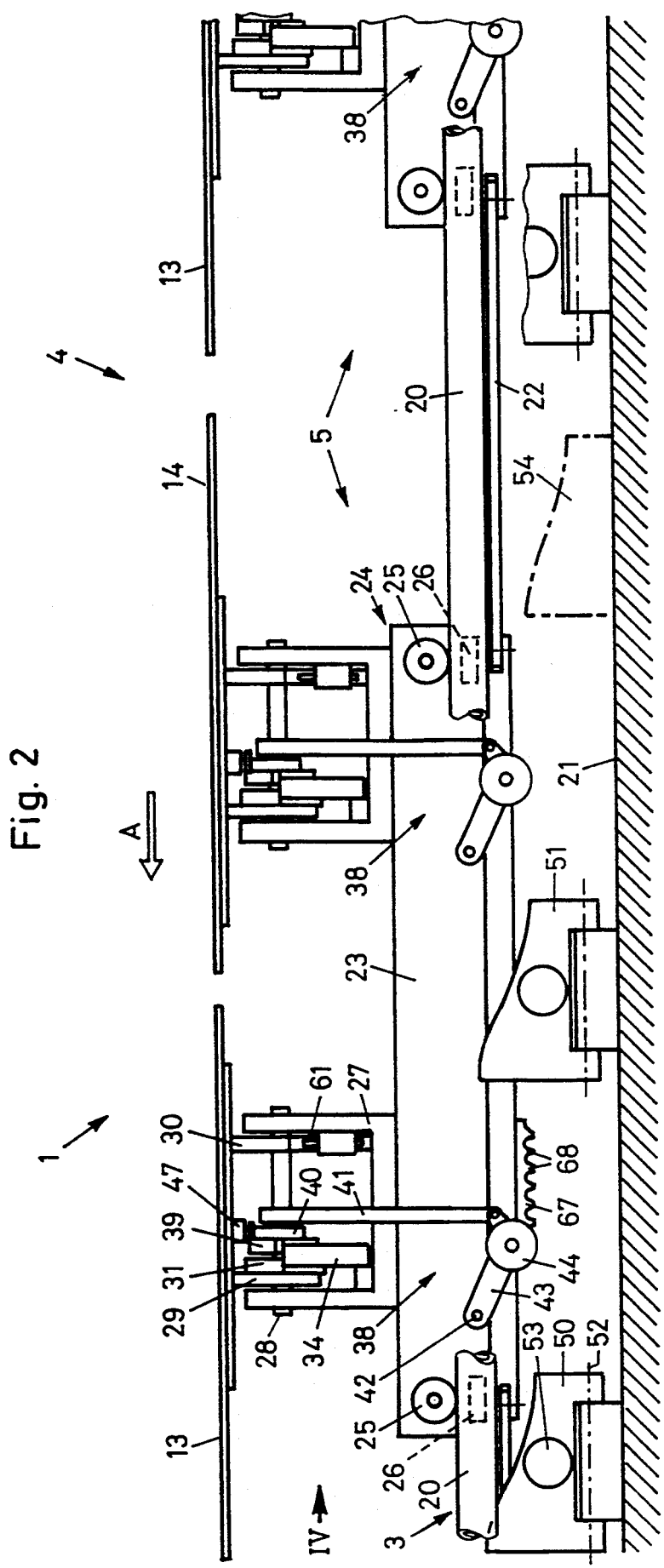
FIG. 2 is a side view of a portion of the plant.
Figure 3:
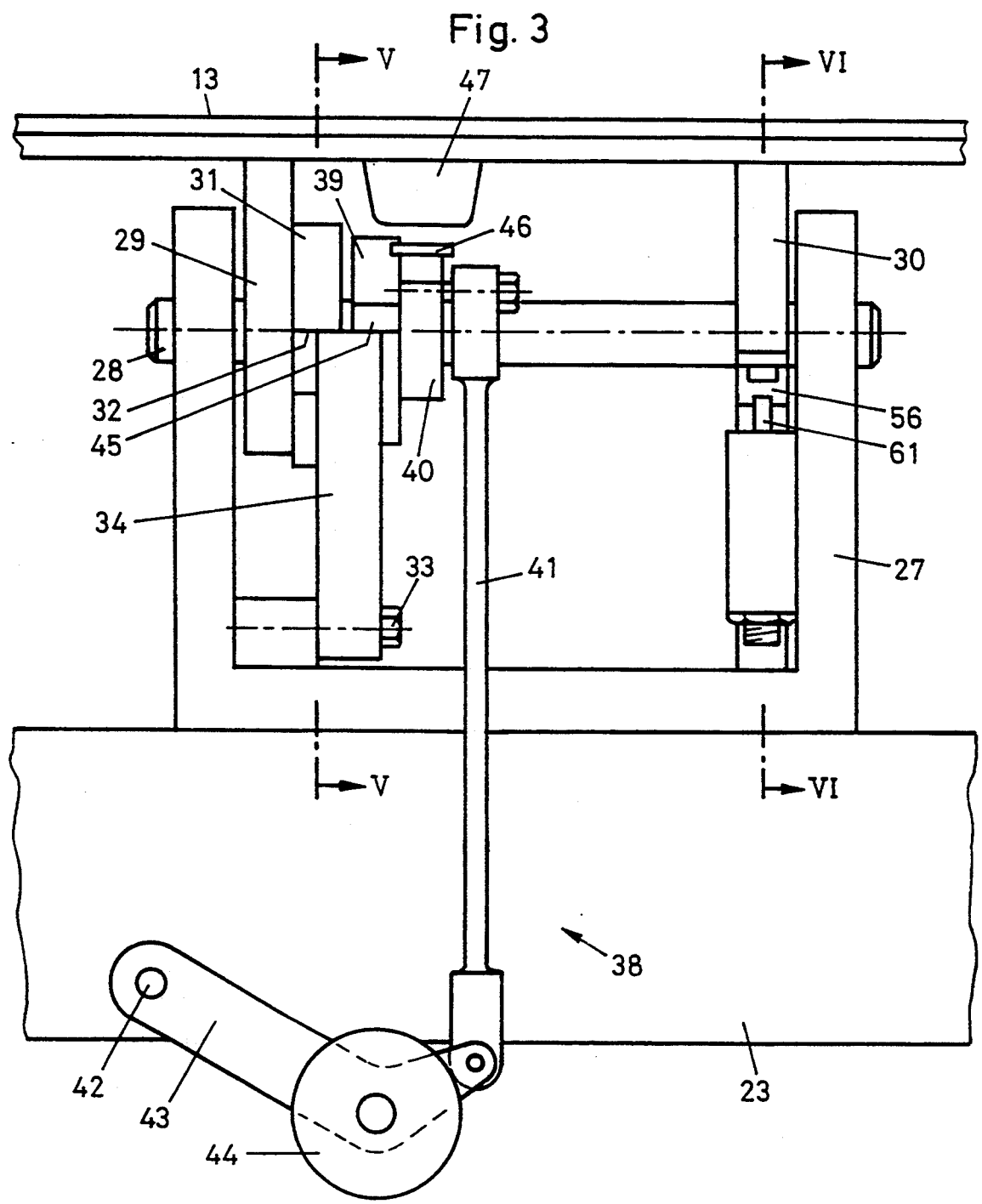
FIG. 3 is an enlarged detail of the view shown in FIG. 2.

The plant (1) according to FIG. 1 is, for example, suitable for the sorting of mail in mail distribution centers. It comprises a closed rail (3) that forms a loop (2) and an endless chain (4) of carts (5) that are coupled to each other and move along the rail (3). A drive (6) consisting of a drive motor (7) and a drive chain (8) moves the carts (4) in the direction (A). Several loading stations (9) at which packages (10) are loaded onto the chain (4) of carts (5) are arranged along the loop (2), and one of several target stations (11) is assigned to each loaded cart (5). At the assigned target station (11) a control device (12) tilts one receptacle (13 or 14) or both receptacles (13, 14) of the loaded cart (5) about an axis that extends in the longitudinal direction of the cart. This results in the package (10) sliding out of the receptacle (13, 14) onto a slanted chute (15) of the target station (11) from where it slides into a shaft (16) which leads, for example, to a collection container arranged below the shaft. The loading stations (9), as well as the target stations (11), are longer in the direction (A) than the sum of the length of both receptacles (13, 14) of a cart (5). This means that long packages can be loaded onto both receptacles (13, 14) of a cart and unloaded at the concerned target station (11) by simultaneous tilting of both receptacles (13, 14). Shorter packages are placed only onto one individual receptacle (13 or 14), which means that only this receptacle (13 or 14) has to be tilted at the target station (11). This also means that the other receptacle (14 or 13) of this cart (5) can simultaneously transport another short package (10) to the same target station (11) or to a different target station. If large packages (10) that occupy both receptacles (13, 14) are relatively rare, the sorting capacity of the plant (1) is nearly doubled by the separation of the transport elements into two individual receptacles (13, 14) per cart. Since both receptacles (13, 14) can collectively serve as a receptacle for a large package and are mounted onto a collective running gear, no relative movements occur between the receptacles in curves or on inclines, so that the large package can be safely transported without any displacement.

FIGS. 2 to 6 show a cart (5) of the plant (1) in detail. The rail (3) consists of two parallel pipes (20) arranged within a lateral distance to each other that are mounted onto a foundation (21) by means of supports, not shown in the figure. The carts (5) of the chain (4) are coupled with each other by toggle links (22) with spherical joints. The carts comprise a supporting beam (23) and a running gear (24) consisting of rollers (25) and guide rollers (26) that roll along the pipes (20), whereby the running gear is attached to the supporting beam. The toggle links (22) are coupled to the support beam (23) adjacent to the plane of the guide rollers (26), so that the tensile forces and the impact forces of the toggle links (22) and the lateral guiding forces only result in minute tilting moments on the cart (5).

Two receptacle carriers (27) are screwed onto the beam (23). The receptacles (13, 14) are supported on these carriers (27) in a swivelling manner by means of bearing bodies (29, 30) with needle bearings, so that the receptacles can be swiveled about collective horizontal axis (28) that extends in the longitudinal direction of the cart. A locking disk (31) has two radial shoulders (32) on its outer perimeter. Two pawls (34) that can be swiveled about axes (33) that extend parallel to the axis (28) engage these shoulders in the starting position of the receptacles (13, 14), illustrated in FIGS. 2, 3, and 5. The pawls (34) are braced against each other by a spring (35).

One activation element (38) is assigned to each receptacle (13, 14). This activation element consists of an unlocking disk (39) that is supported in a swiveling manner on the axis (28) by means of other needle bearings, an activation lever (40) that is screwed onto the disk (39), two connecting rods (41), one arm (43) each on the supporting beam (23) which can be swiveled about a transverse axis (42) and one activation roller (44), which is supported on the arm (43) in a rotating manner. The disk (39) has two slanted surfaces (45) that extend parallel to the axis (28) and lift one of the two pawls (34) from its locking position illustrated in FIG. 5 during the swiveling movement of the disk (39) and thus unlocks the locking disk (31). After a minute unlocking angle is obtained, one of the two disks (46) on the free ends of the levers (40) makes impact with a rubber buffer (47) attached on the receptacle (13, 14) and thus tilts this receptacle (13, 14).

Figure 4:
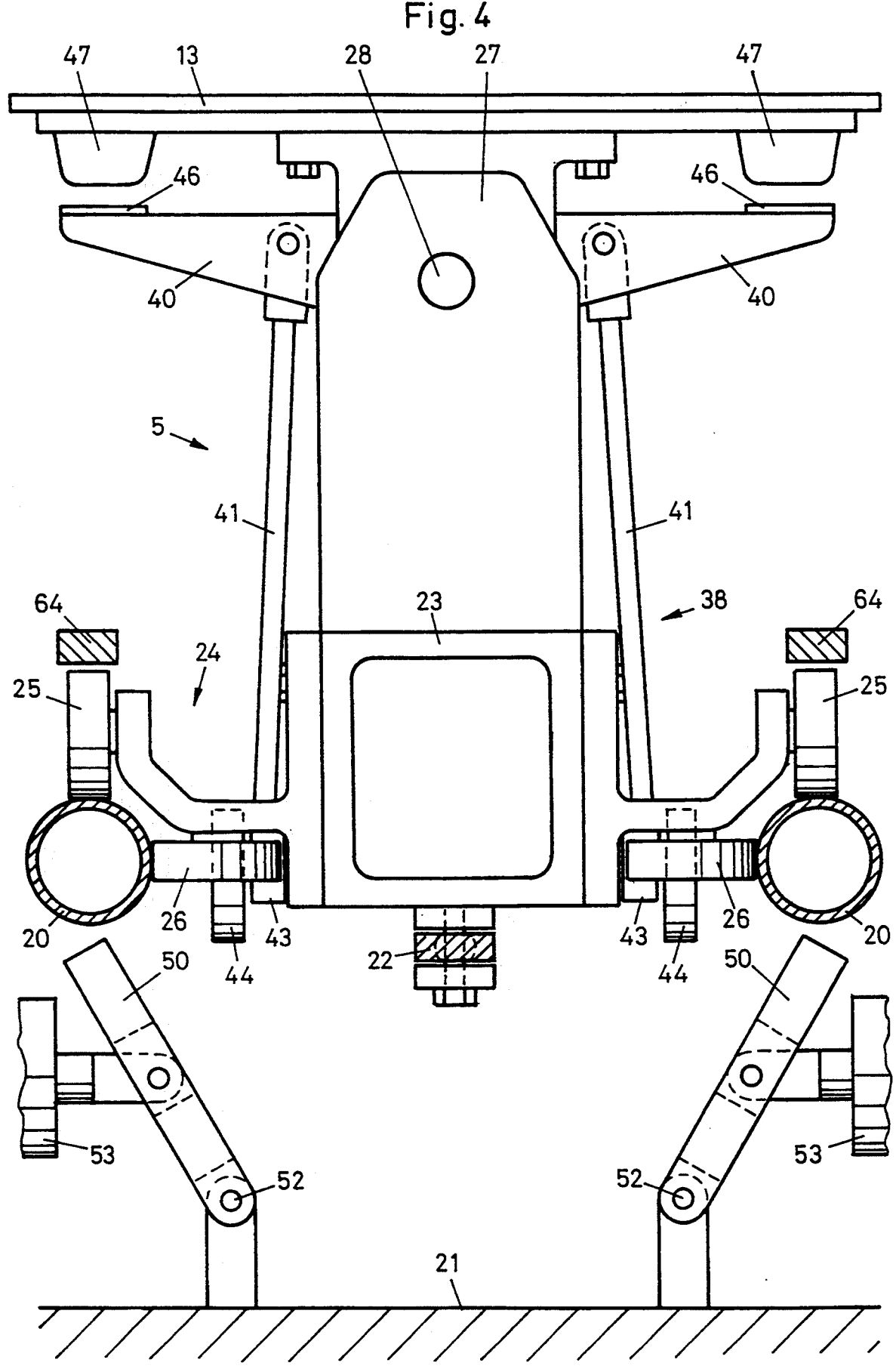
FIG. 4 is a front view of a cart.
Figure 5:
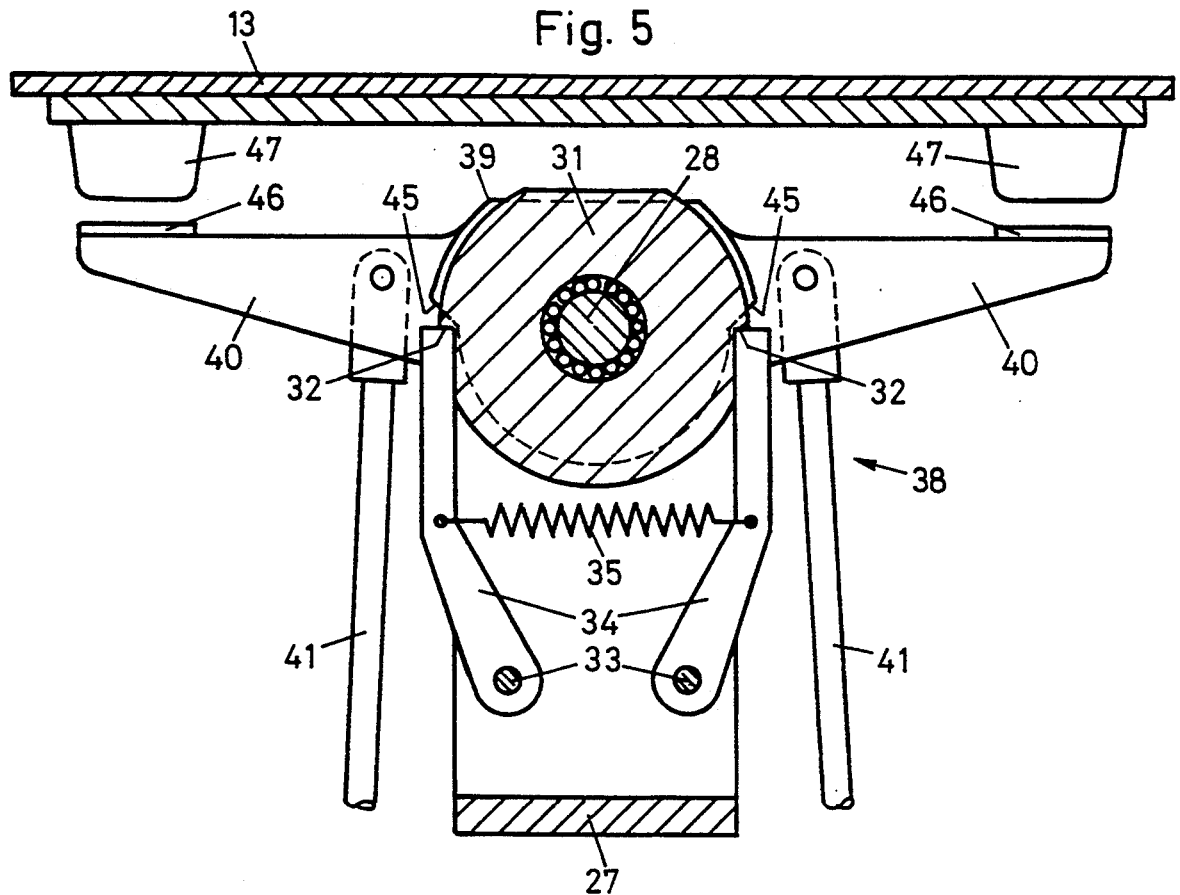
FIGS. 5 and 6 are sections along the lines V—V and VI—VI in FIG. 3.

In order to tilt the receptacles (13, 14), each target station (11) has two radial cams (50, 51) on the side of the rail (3) which opposes the station, whereby the radial cams can be swiveled relative to the foundation (21) from the tilted inactive position illustrated in FIG. 4 into a vertical active position about a horizontal axis (52) by means of one pneumatic cylinder (53) each. The roller (44) under consideration makes impact with the radial cam (50, 51) so that it moves into the vertical active position, thus displacing the lever (40) with the unlocking disk (39). Both radial cams (50, 51) of a target station (11) have the same distance from each other as the two activation rollers (44) on one side of the cart (5).

Figure 6:
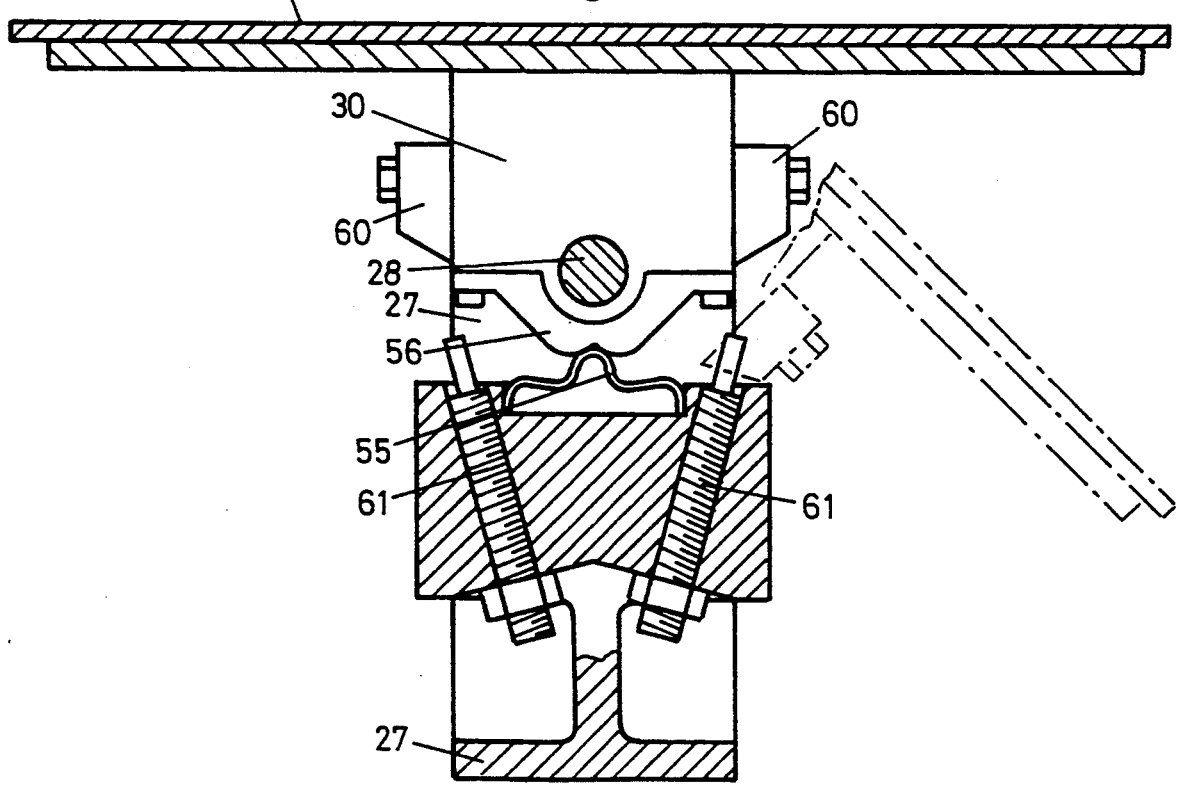

Return cams (54) which return each tilted receptacle (13, 14) again into the horizontal starting position are rigidly attached to the foundation (21) ahead of curves and inclines. The return cam (54) is illustrated with dash-dotted lines in FIG. 2. It is of course not actually arranged directly after the radial cam (50, 51). The return cams (54) take hold of the lowered rollers (44) and raise the same, so that the lever (40) is brought into its central position. However, this does not mean that the receptacle (13, 14) under consideration is in its starting position since it can be swiveled relative to the lever (40) into the unlocking angle. The final reversal of the receptacle (13, 14) into the starting position is effected by an elastic catch element (55), consisting, for example, of polyamide, into which a catching projection (56) of the bearing body (29) engages (FIG. 6).

In order to dampen the movement of the receptacle into its final position, two stopping elements (60) are attached onto the bearing body (30) which make impact with one shock absorber (61) each of which is attached on the carrier (27).

In order to prevent the dynamic forces acting upon the cart (5) from tilting it, one additional guide rail (64) is attached above each pipe (20) at curves and inclines and at all target stations (11) (FIG. 4).

The drive of the chain (4) of carts is effected by the fact that at least one toothed rack (67) is attached on the lower side of the supporting beam (23) of each cart (5). The teeth (68) of the toothed rack (67) lie lower than the toggle links (22). The driving chain (8) is sufficiently long so that at least two toothed racks (67) of adjacent carts (5) simultaneously engage.

Figure 7:
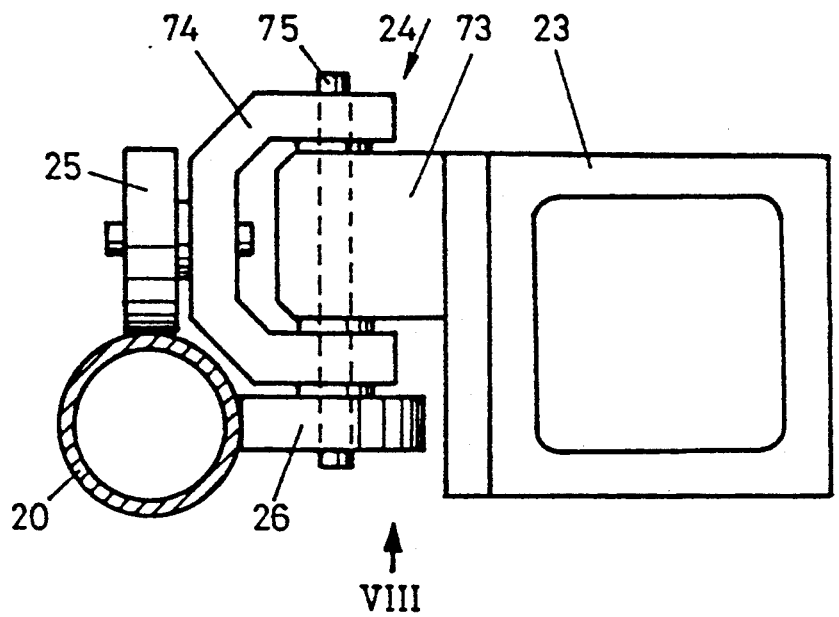
FIG. 7 is a front view of a different version of the running gear.
Figure 8:
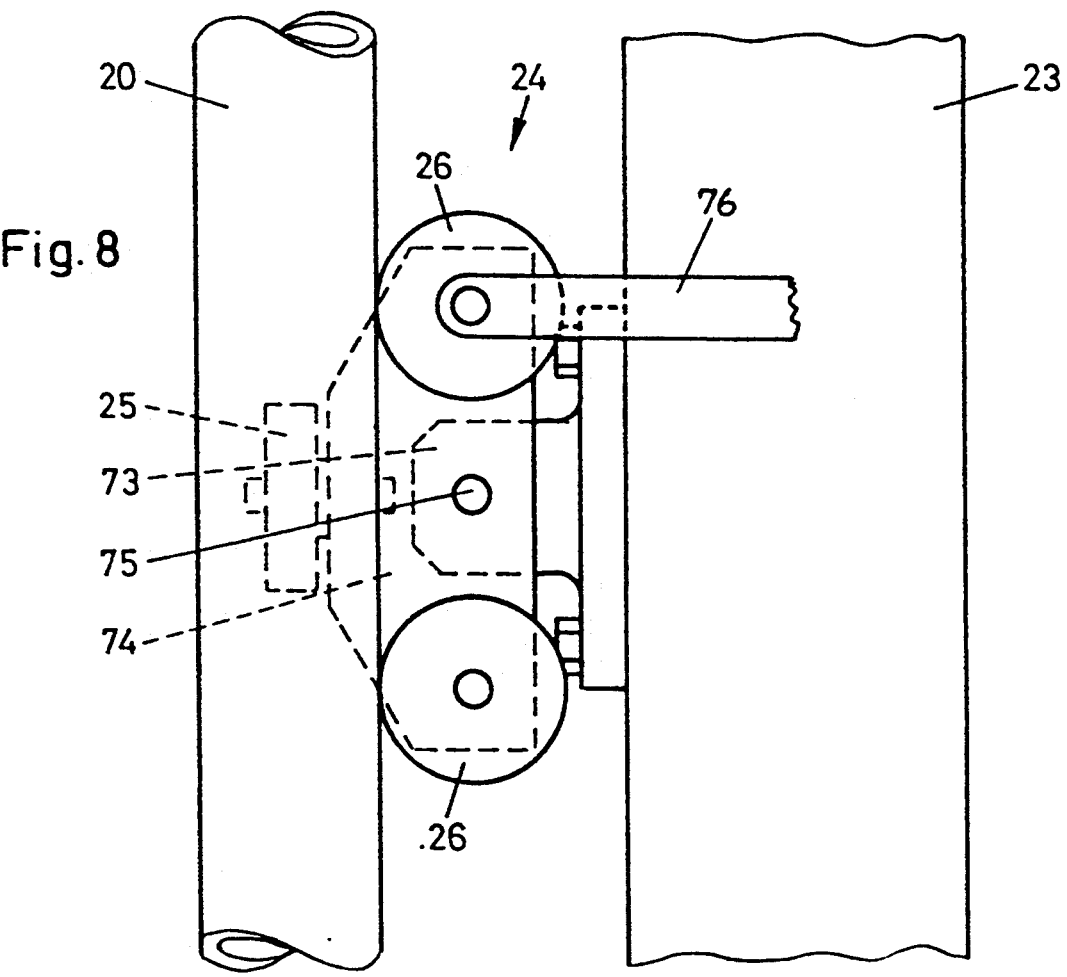
FIG. 8 is a bottom view of the moving gear according to FIG. 7.

FIGS. 7 and 8 show a different variation of the running gear (24) that is particularly suitable for carts (5) with larger distances between the axles. In order to avoid a slanted position of the rollers (25) against the pipes (20) and thus the related wear and tear of the rollers on curves, the roller retainer (74) arranged on a carrier (73) that is screwed onto the supporting beam (23) can be swiveled about a vertical axis (75). Two guide rollers (26) are arranged on both sides of the axis (75) on the roller retainer (74). These two guide rollers (26) result in the roller retainer (74) and therefore the roller (25) being guided parallel to the pipe (20) independently of the transverse position of the supporting beam (23) on curves. This form of construction makes it possible to design the carts (25) much longer, so that three receptacles (13, 14) with corresponding activation elements (38) can be mounted on each cart if so required. Left and right retainer (75) may be interconnected by a tie bar (76).

With longer carts it can be practical to provide the activation rollers (44) within regular distances. This means that the time available for the engagement of the radial cams (50, 51) is equal for all rollers (44).

The described plant obtains the optimal capacity of all receptacles (13, 14) and thus a more efficient operation, even with strongly fluctuating sizes of the piece goods. The positive locking of the receptacles (13, 14) in their starting position ensures a safe operation even at higher transport speeds. If a locking or activation mechanism becomes defective, the receptacle (13, 14) under consideration is locked by the control device (12), and the receptacle carrier (27) is exchanged for a new one during a subsequent interruption of the operation. This exchange can be executed very quickly since the chain of carts (4) must not be interrupted. The maintenance of the described plant is thus quite effortless.

Depending on the purpose of the application, which means depending on the maximum size of the piece goods to be transported, shorter or longer receptacles (13, 14) can be mounted on identical carts (5), and only the length of the toggle links (22) must be correspondingly adapted. This means that the carts (5) can be efficiently manufactured in large quantities and the warehousing can be simplified.

If all of the target stations (11) are arranged on the same side of the loop (2), the activation elements (38) can be omitted on the other side of the cart (5). The return cams (54) are, in this particular instance constructed in such a way that they pull the raised activation rollers (44) towards the bottom.

Depending on the purpose of the application, it may be practical to guide the two frontal activation rollers (44) of the carts (5) on a different track than the two rear activation rollers (44), and, correspondingly, to laterally offset the radial cams (50, 51) of each target station (11) against each other, whereby the cam (50, 51) with the smaller distance from the plane of symmetry of the rail (3) is, for example, folded towards the inside. This means that a larger distance is available for the tilting of the radial cams (50, 51) of the carts (5) between the active and inactive positions, so that the transport speed is increased or the accuracy requirements for the activation of the radial cams can be reduced.

The activation roller (44) and radial cams (50, 51) can also be interchanged.

What is claimed is:

1. A sorting plant for piece goods which comprises:
   a closed rail that forms a loop;
   a plurality of carts that are coupled with each other to form an endless chain of carts and are guided on said rail, wherein each of said carts is provided with two receptacles that are arranged behind each other in a transport direction and can be swiveled about an axis that extends in the longitudinal direction of said cart, and wherein said receptacles can be tilted from a horizontal starting position into a tilting position and each said cart is provided with two activation elements for the independent tilting of both of said receptacles between the two said positions;
   a drive to move said chain of carts along said rail;
   at least one loading station arranged along said loop to order to load said receptacles with the piece goods;
   a plurality of target stations arranged along said loop to receive the piece goods, wherein each target station is at least as long in said transport direction as the sum of the length of both said receptacles of each said cart;
   two switching elements each assigned to each said target station and which can be individually switched between an inactive and an active condition, wherein said switching elements in their active condition activate one of said two activation elements on the passing cart to tilt the respective receptacle into said tilting position;
   a control device by means of which one of said target stations is assigned to the piece goods that are loaded onto said cart at said loading station, whereby said two switching elements of each target station can be separately addressed by said control device in such a way that either both of said switching elements of said target station are simultaneously switched into said active condition, or only a selected one of said switching elements or none of said switching elements is switched into said active condition during passage of the individual cart, so that both of said receptacles of said cart are tilted simultaneously, or that only one or none of the two receptacles is titled at said target station; and
   at least one return element arranged along said loop in order to return said tilted receptacles into their said horizontal starting position.

2. A plant according to claim 1, wherein both of said activation elements of each said cart and both of said switching elements of each said target station comprise interacting activation rollers and cams that have the same distance from each other.

3. A plant according to claim 1 or 2, wherein said two activation elements of each said cart have a different distance from a vertical central longitudinal plane of said cart, and said two switching elements of each said target station have said same different distance from a vertical plane of symmetry of said rail in said active condition.

4. A transport cart for utilization in a sorting plant said cart comprising:
   a running gear with support rollers and lateral guide rollers in order to move along a rail of said sorting plant,
   a coupling element on both sides of said running gear in order to connect said transport cart with adjacent transport carts to form a chain of said transport carts,
   two receptacles that are arranged behind each other in a longitudinal direction of said transport cart and are individually supported on said running gear in a swiveling manner about a common axis that extends in said longitudinal direction of said transport cart, whereby said receptacles can be swiveled from a horizontal starting position to a tilting position, and wherein said two receptacles in their starting position form a substantially throughgoing supporting surface for supporting goods that are longer than each of said receptacles; and
   two activation elements for the independent tilting of both of said receptacles between the two positions.

5. A cart according to claim 4, wherein each receptacle is locked into its starting position by a spring-loaded pawl that is unlocked during a first movement of the assigned activation element, wherein each receptacle is additionally centered relative to said running gear in said horizontal starting position by a resilient catch element.

6. A cart according to claim 5, wherein each activation element comprises a lever that is connected with said activation element by a connecting rod and can be swiveled about said axis of said receptacles, said lever comprises a slanted surface, a free end and a carrier disposed on said free end, whereby upon said first movement of the assigned activation element, said slanted surface raises the assigned spring-loaded pawl, and said carrier tilts the corresponding receptacle, and wherein said carrier is a certain distance away from a corresponding opposing surface of said receptacle while in said starting position.

7. A cart according to claim 6, wherein said pawl in said starting position of the corresponding receptacle engages into a locking notch arranged on a cylindrical outer surface of a disk that is connected with said receptacle, and wherein said pawl can be swiveled about an axis that extends parallel to said swivel axis of said receptacle.

8. A cart according to claim 6, wherein one of said carrier and said corresponding opposing surface is constructed as an elastic buffer.

9. A cart according to claim 7, wherein one of said carrier and said corresponding opposing surface is constructed as an elastic buffer.

10. A cart according to claim 4, wherein each receptacle makes impact with a damper while in its tilting position.

11. A cart according to claim 5, wherein each receptacle makes impact with a damper while in its tilting position.

12. A cart according to claim 6, wherein each receptacle makes impact with a damper while in its tilting position.

13. A cart according to claim 7, wherein each receptacle makes impact with a damper while in its tilting position.

14. A cart according to claim 8, wherein each receptacle makes impact with a damper while in its tilting position.

15. A cart according to claim 9, wherein each receptacle makes impact with a damper while in its tilting position.

16. A cart according to one of the claims 4 to 15, wherein said coupling elements on said running gear are arranged adjacent to a plane of said lateral guide rollers.

* * * * *